United States Patent [19]

Woody et al.

[11] Patent Number: 5,434,493
[45] Date of Patent: Jul. 18, 1995

[54] FIXED CORE INDUCTIVE CHARGER

[75] Inventors: George R. Woody, Redondo Beach; Herbert J. Tanzer, Topanga; John T. Hall, Woodland Hills, all of Calif.

[73] Assignee: Hughes Aircraft Company, Los Angeles, Calif.

[21] Appl. No.: 140,954

[22] Filed: Oct. 25, 1993

[51] Int. Cl.⁶ .............................................. H02J 7/04
[52] U.S. Cl. .................... 320/2; 336/DIG. 2
[58] Field of Search ............... 320/2, 21; 336/DIG. 2

[56] References Cited

U.S. PATENT DOCUMENTS

| | | | |
|---|---|---|---|
| 3,938,018 | 2/1976 | Dahl | 320/2 |
| 4,347,472 | 5/1982 | Lemelson | 320/2 |
| 4,496,896 | 1/1985 | Melocik et al. | 320/2 |
| 5,070,293 | 12/1991 | Ishii et al. | 320/2 |
| 5,157,319 | 10/1992 | Klontz et al. | 320/2 |
| 5,216,402 | 6/1993 | Carosa | 336/DIG. 2 X |
| 5,264,776 | 11/1993 | Hulsey | 320/2 |
| 5,323,099 | 6/1994 | Bruni et al. | 320/2 |
| 5,327,065 | 7/1994 | Bruni et al. | 320/2 |

*Primary Examiner*—Kristine L. Peckman
*Attorney, Agent, or Firm*—Leonard A. Alkov; W. K. Denson-Low

[57] ABSTRACT

An inductively-coupled transformer charging apparatus comprising a charging port having a nonmoving secondary core and a charging coupler that is insertable therein. The charging coupler comprises a primary winding disposed around a primary core. The charging port comprises a fixed secondary core comprising two secondary core halves and two secondary windings, and includes an opening into which the charging coupler is inserted. Heat transfer media in the charging port remove heat during charging. The opening and coupler are sized such that a gap is provided between the secondary core halves and the coupler to provide for a slip fit therebetween. The close fitting relationship between the coupler and the charge port acts to remove dirt build-up present on the coupler as it is inserted into the charging port. The basic requirements of the present invention are that the secondary core has a fixed, nonmoving configuration, that the coupler be insertable into the secondary core, and that the center magnetic core of the coupler form part of a complete magnetic circuit in conjunction with the secondary core. The advantages of the present invention are simplicity and reliability. The present invention does not require moving parts to open and close the primary core halves. The gap provided between the secondary core halves and the inserted coupler is designed so that the respective cores are separated by a minimum, predefined distance, both of which are important parameters of the electrical design of the charging apparatus. Also, there are fewer problems due to dirt buildup due to the wiping action provided by the charging port when the coupler is inserted therein.

19 Claims, 6 Drawing Sheets

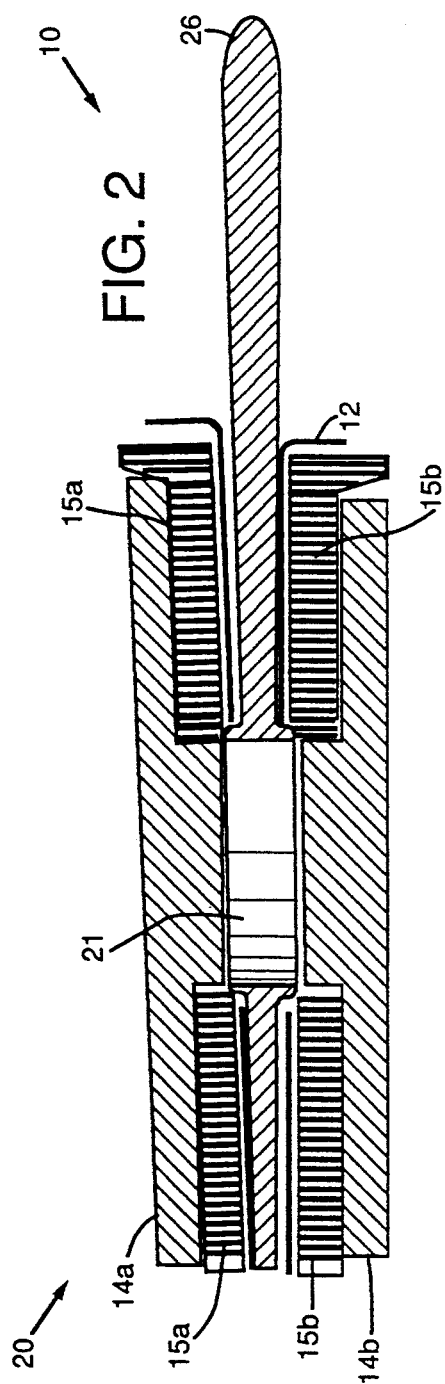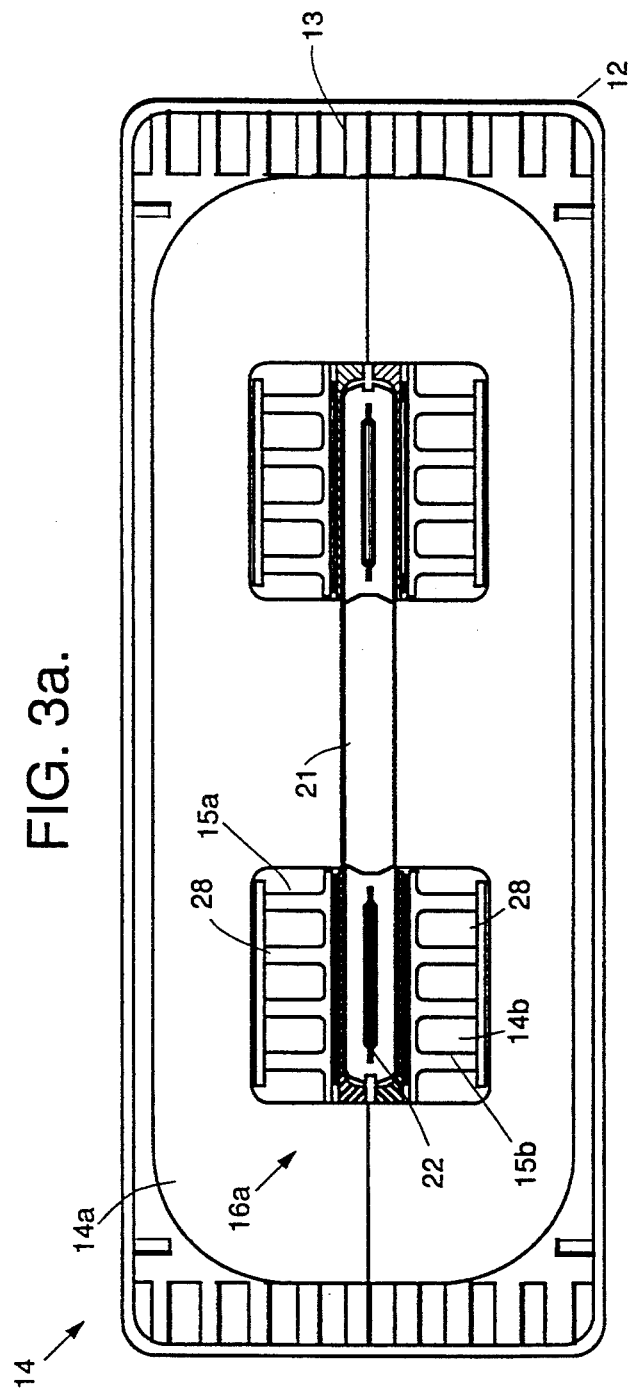

FIXED CORE INDUCTIVE CHARGER

BACKGROUND

The present invention generally relates to inductive charging apparatus, and more particularly, to an inductive charger for use with electric vehicles that comprises a charging port including a fixed secondary core and secondary winding and an insertable charging coupler including a primary core and primary winding wherein a precise gap is provided between the respective cores.

The prior art for inductive coupling designed for use in electric vehicles involves an on-board charge port having a mechanized core assembly wherein two core halves open and close to accept an off-board coupler that is inserted between the cores. Mechanization of the prior art apparatus includes springs and levers for actuating the two core halves, and this approach has several drawbacks. The spring and lever mechanisms are prone to failure, and there is concern about chatter and core breakage during road-induced vibration and shock. In addition, the core surfaces can collect dirt, which prevents full closing of the core halves after insertion of the coupler between the core halves. This results in magnetic coupling inefficiencies due to variable, out-of-tolerance gaps between the cores.

Accordingly, it is an objective of the present invention to provide an inductive charging apparatus that employs a fixed charging port and an insertable charging coupler wherein a precise gap is maintained between the coupler and the port to eliminate the above-cited problems.

SUMMARY OF THE INVENTION

In order to provide for the above and other objectives, the present invention comprises an improved inductively-coupled transformer charging apparatus comprising a charging port and a charging coupler that is insertable therein. The charging coupler comprises a primary winding disposed around a primary core. The charging port comprises a fixed secondary core comprising two secondary core halves and two secondary windings, and includes an opening into which the charging coupler is inserted. Heat exchangers are provided as part of the charging port to remove heat during charging. The opening is sized such that there is a predetermined gap provided between the secondary core halves and the insertable charging coupler so that the charging coupler slides into the charging port in a manner commonly known as a "slip fit". The present invention provides for direct insertion of the charging coupler into the charge port without the use of mechanized movable secondary core halves. Also the close fitting relationship between the charging coupler and the charge port acts to remove any dirt build-up present on the charging coupler as it is inserted into the charging port.

More specifically, the present invention provides for inductive charging apparatus that includes a charge port comprising a housing and an outer heat exchanger disposed adjacent the internal periphery of the housing. First and second magnetic core halves comprising portions of an E-shaped core are disposed in the housing adjacent the outer heat exchanger, and first and second secondary windings disposed within the first and second magnetic core halves of the E-shaped core. Inner heat exchangers are disposed between the first and second secondary windings and the first and second magnetic core halves. An opening is formed between the respective first and second magnetic core halves that is adapted to receive the charging coupler therein. The charging coupler is comprised of a magnetic core that forms a center portion of the E-core, and a primary winding disposed around the magnetic core. A predetermined gap is provided between respective outer surfaces of the coupler and inner surfaces of the charge port adjacent the opening.

The center magnetic core may be configured in a round, square or rectangular shape, depending upon the geometry of the magnetics design. The core geometry may have any configuration that meets insertion requirements, such as an "EE", "EP", or "RS" core configuration, for example. The primary and secondary windings may be formed as circular helix windings made of foil, a multiple layer winding, or a flat spiral winding made of foil or wire having a single layer, for example. The basic requirements of the present invention are that the secondary core, comprising the magnetic core halves, have a fixed, nonmoving configuration, that the coupler, comprising the center magnetic core and primary winding, be insertable into the secondary core, and that the center magnetic core form part of a complete magnetic circuit in conjunction with the secondary core.

The advantages of the present invention are simplicity and reliability. There are no mechanisms used to open and close the primary core halves. The primary core halves are disposed in a fixed, stationary position, and are provided with an opening or slot just large enough to permit insertion of the coupler without binding. The fixed gap provided between the secondary core halves and the inserted coupler is designed so that the primary core is separated from the secondary core halves by a minimum and predefined distance, both of which are important parameters of the electrical design of the charging apparatus. There are fewer problems due to dirt build-up due to the wiping action provided by the charging port when the coupler is inserted therein. Also, effective heat transfer media are integrated within the secondary core assembly to remove heat generated during charging.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 illustrates a cross sectional side view of the charging apparatus of FIG. 1; and FIGS. 3a and 3b illustrate a cross sectional front view of the charging apparatus of FIG. 1.

DETAILED DESCRIPTION

Figure 1:
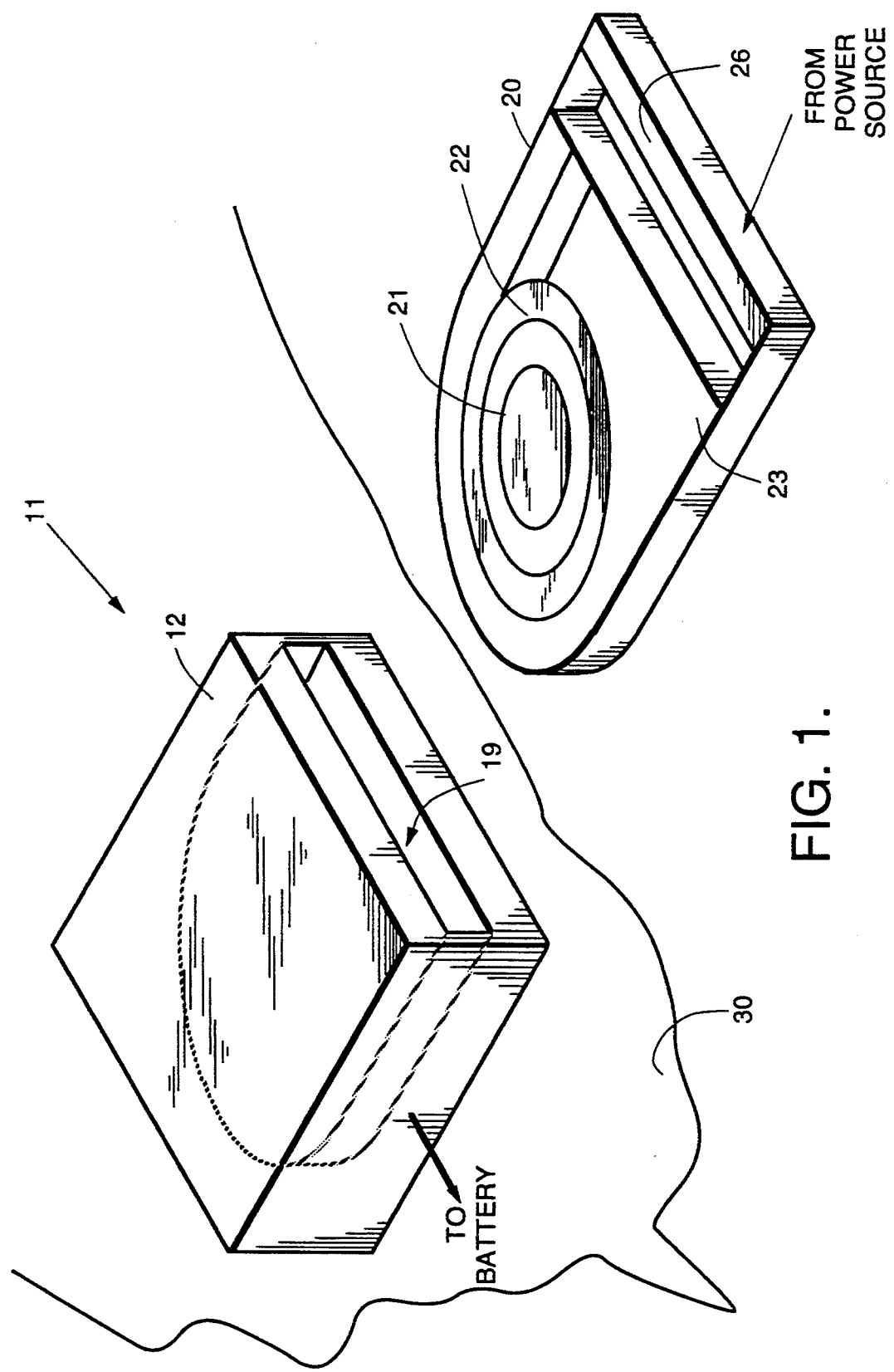
FIG. 1 illustrates a perspective view of charging apparatus in accordance with the principles of the present invention.

Referring to the drawing figures, FIG. 1 charging apparatus 10 in accordance with the principles of the present invention. The charging apparatus 10 is comprised of a charge port 11 and a charging coupler 20. The charge port 11 includes a housing 12 having an opening 19 into which the charging coupler 20 is inserted. The charge port 11 is coupled to a battery (not shown) of an electric vehicle 30 in which it is housed. The charging coupler 20 is shown with the interior exposed, and is comprised of a housing 23 having a handle 26, and a center magnetic core 21 or "puck" 21, that may be comprised of ferrite, for example, around which is disposed a primary winding 22. The charging coupler 20 is designed to be inserted into the opening 19 of the charge port 11 in order to couple current to the battery from an external power source (not shown).

Figure 3B:
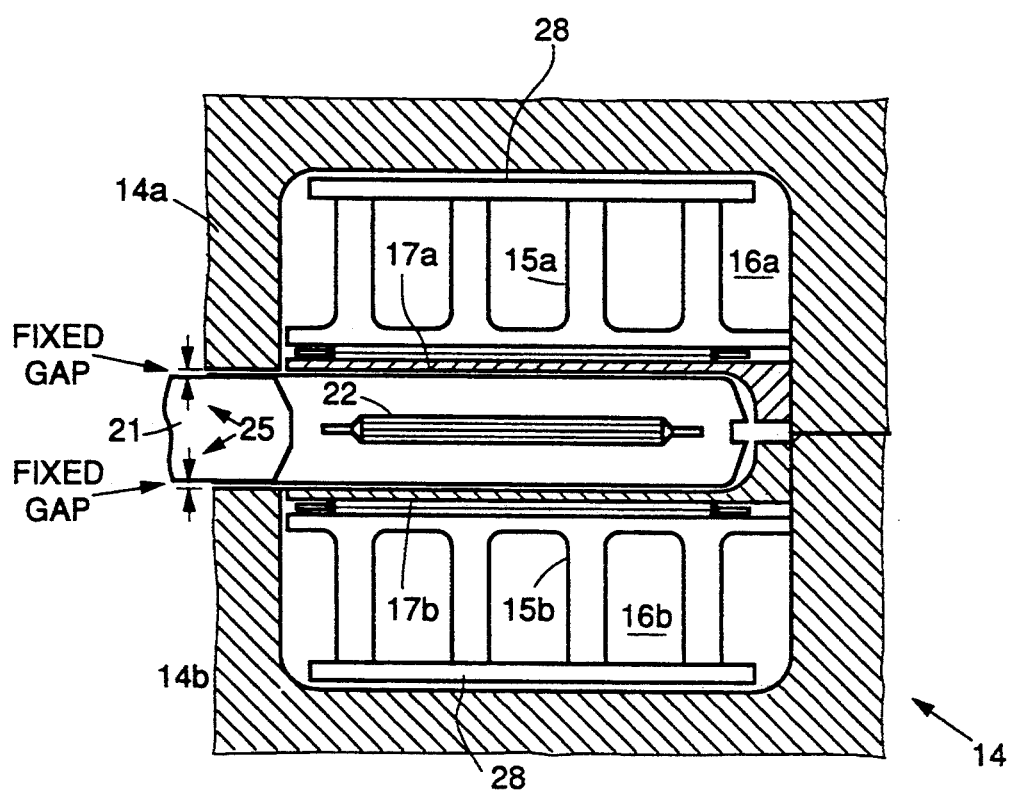

FIG. 2 illustrates a cross sectional side view of the charging apparatus 10, while FIGS. 3a and 3b illustrate cross sectional front views of the charging apparatus 10. The housing 12 of the charge port 11 includes an outer heat exchanger 13 disposed adjacent the periphery of the inside lateral edges thereof. The housing 12 is generally rectangular in shape, but this should not be considered as limiting, since any convenient shape may be employed. Inside the outer heat exchanger 13 is disposed two magnetic core halves 14a, 14b, that may be comprised of ferrite, for example, that together form a secondary core 14. The magnetic core halves 14a, 14b may be formed in the shape of an "E-core", for example, which is shown more clearly in FIG. 2. Inner heat exchangers 15a, 15b are disposed within openings 16a, 16b formed in each of the magnetic core halves 14a, 14b. The inner heat exchangers 15a, 15b may be secured in the openings 16a, 16b by means of adhesive 28, for example. First and second secondary windings 17a, 17b are disposed adjacent each of the magnetic core halves 14a, 14b. The opening 19 is formed between the respective first and second magnetic core halves 14a, 14b that provides for a predetermined spacing between adjacent surfaces thereof.

Figure 4A:
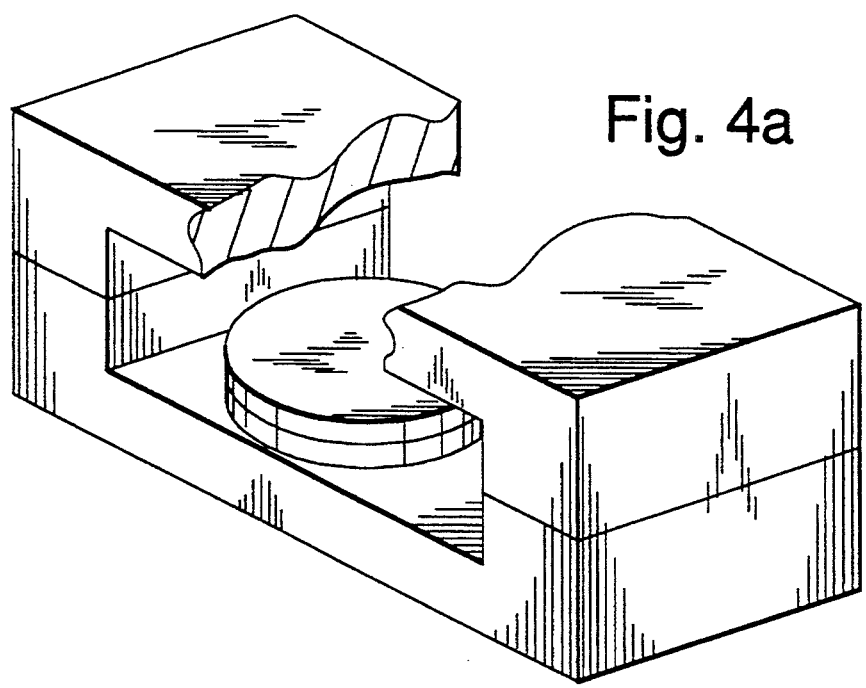
FIGS. 4a to 4h illustrate various configurations with views of the specifics of the core halves and the center core of the charging apparatus of FIG. 1.

The coupler 20 is comprised of a center magnetic core 21 that may be comprised of ferrite, for example, around which the primary winding 22 is disposed. The center magnetic core 21 and primary winding 22 are enclosed in the housing 23 which may be comprised of plastic, for example, that is in the shape of a wand, or has the handle 26 on it that allows a user to grip it. The center magnetic core 21 in the coupler 20, when inserted into the opening 19 in the charge port 11, forms pan of a completed magnetic circuit, and more particularly, provides the center portion of the E-core magnetic design (FIG. 4a) that couples center portions of the magnetic core halves 14a, 14b together.

Figure 4B:
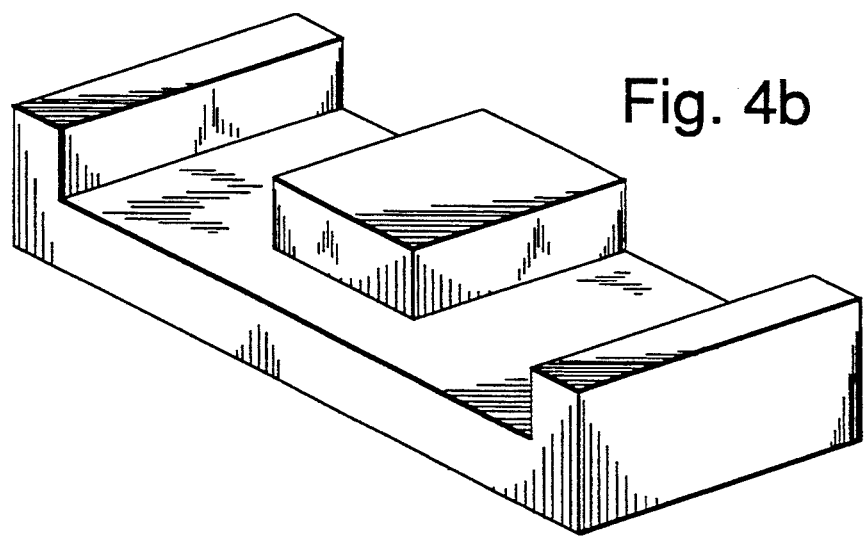
Figure 4C:
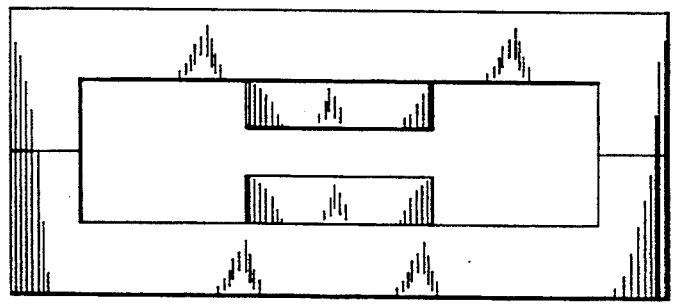
Figure 4D:
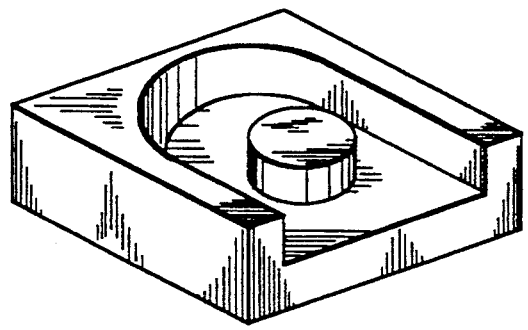
Figure 4E:
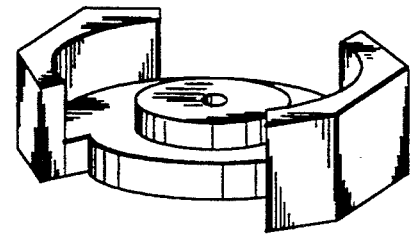
Figure 4F:
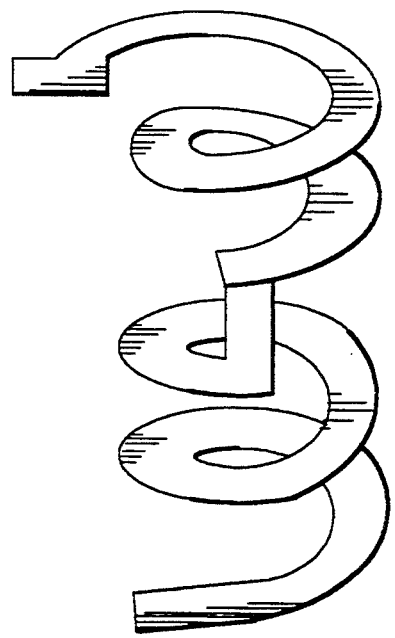
Figure 4G:
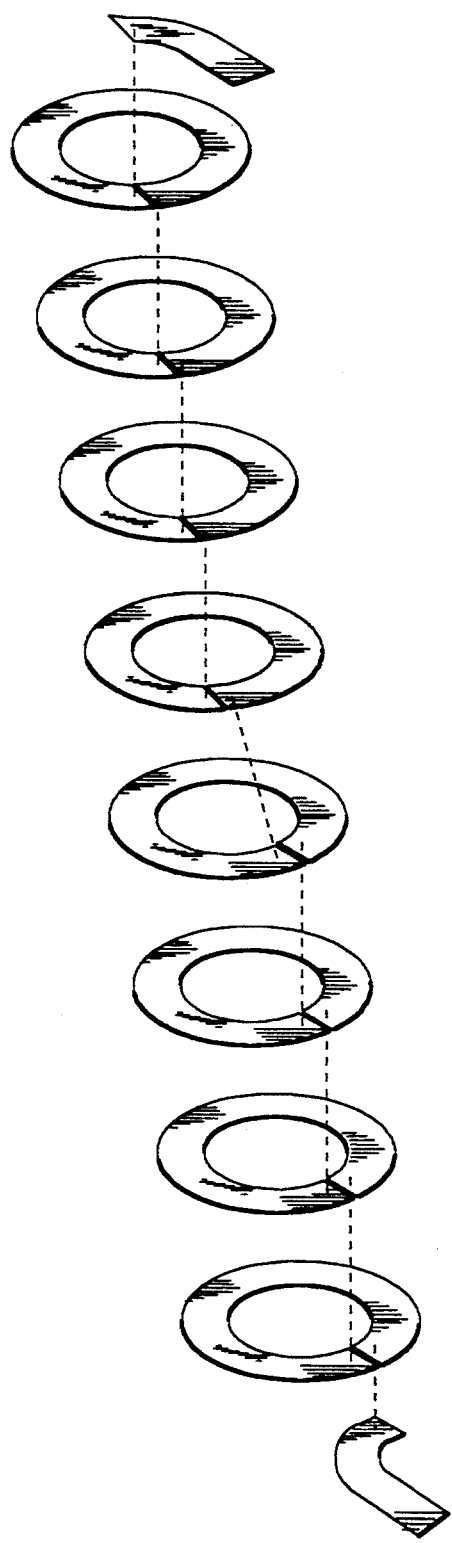
Figure 4H:
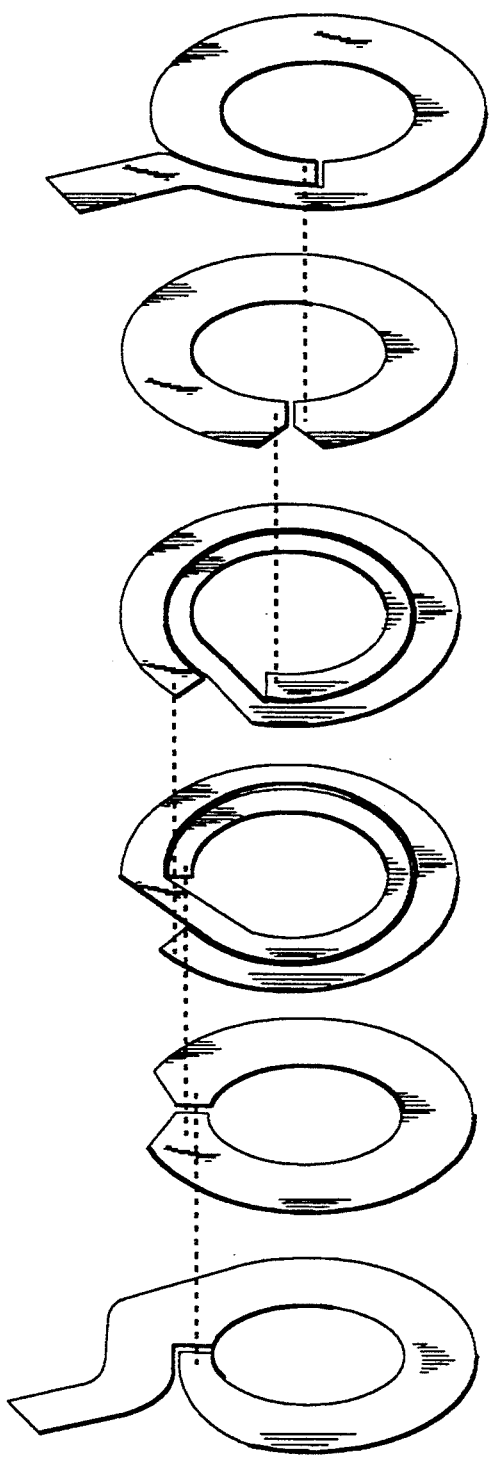

The center magnetic core 21 may be configured in a round (FIG. 1), square, rectangular (FIG. 4b), or hexagonal shape, for example, depending upon the geometry of the magnetics design. In addition, the core geometry may have an "EE" core configuration (FIG. 4c), an "EP" core configuration (FIG. 4d), or an "RS" core configuration (FIG. 4e), for example. Furthermore, the primary and secondary windings 17a, 17b, 22 may be formed as circular helix windings made of foil (FIG. 4f), a multiple layer winding (FIG. 4g), or a flat spiral winding made of foil or wire having a single layer (FIG. 4h), for example. The coupler 20 may use a round puck 21 having a circular winding 22 disposed therearound, or may use a square or rectangular puck 21 having a correspondingly square or rectangular winding 22 disposed therearound, for example. The basic requirements of the present invention are that the secondary core 14, comprising the magnetic core halves 14a, 14b, have a fixed, nonmoving configuration, that the coupler 20, comprising the center magnetic core 21 and primary winding 22, be insertable into the secondary core 14, and that the center magnetic core 21 form part of a complete magnetic circuit in conjunction with the magnetic core halves 14a, 14b of the secondary core 14.

The heart of the charging apparatus 10 of the present invention is provided by fixed gaps 25 formed between respective outer surfaces 18a, 18b of the coupler housing 12 and respective inner surfaces 27a, 27b of the charge port 11. A nominal fixed gap 25 of 0.010+/−0.004 inches total between the outer surfaces 18a, 18b of the inserted coupler 20 and inner surfaces 27a, 27b of the charge port 11 is provided. The two fixed core halves 14a, 14b and the puck have relative dimensions such that the gap 25 therebetween is creates the nominal fixed gap cited above.

The fixed core design may utilize a conventional "E-core" magnetics configuration, for example. Inherent in the slide-in approach of the charging apparatus 10 of the present invention is that while most of the E-core is part of the charge port 11, the separate center magnetic core 21 is integrated into the coupler 20. Thus, the charge port 11 contains the secondary windings 17a, 17b and the two core halves 14a, 14b, while the coupler 20 houses the primary winding 22 and the puck 21 that completes the E-core. Maintaining the fixed gap 25 between the mating surfaces of the center portion of the core is essential to electrical performance, ease of insertion and alignment, and robustness to minimizing problems due to dirt build-up. A nominal fixed gap 25 of 0.010+/−0.004 inches total between the inserted coupler 20 and inner surfaces 27a, 27b the charge port 11 meets desired electrical requirements and provides for producibility of the charging apparatus 10. The inner heat exchangers 15a, 15b located inside the core halves 14a, 14b in the charge port 11 dissipate heat originating from the halves 14a, 14b and windings 17a, 17b, 22.

Assembly of the charging apparatus 10 is as follows. The two core halves 14a, 14b in the charge port 11 are roughly pressed and are then precision machined at the critical interfaces. The two core halves 14a, 14b are permanently joined together at their adjacent interfaces by bonding or strapping. The center core 21 is press-fitted or molded into the plastic housing 12 of the coupler 20. The center core 21 is precision machined to extend slightly above the plastic housing 12 of the coupler 20, thus ensuring the predictable small gap 25 at both lateral surfaces of the center core of the coupler 20, and at the same time providing for a small space to avoid plastic interference during insertion. The precision machining operation can hold dimensions and flatness to +/−0.001 inches at the core interfaces, making the size of the predictable gap 25 obtainable.

The secondary windings of the charge port 11 are laminated to air-cooled extended surface heat sinks. Since the tolerance stack-up of respective secondary windings 17a, 17b and heat exchangers 13 15a, 15b together is relatively large, a method of maintaining the coplanarity of the secondary windings 17a, 17b to the center core 21 of the charge port 11 is necessary. This is accomplished by cutting the depth of the core section that houses the respective secondary winding 17a, 17b and heat exchangers 13, to be deeper than their combined thicknesses by a predetermined amount that allows the injection of the thermally conductive adhesive 28 into the space between the inner heat exchangers 13 and the respective inner halves 14a, 14b. The coplanarity is then maintained using a bonding jig or fixture.

Once assembly is accomplished, the distance between respective core halves 14a, 14b has a dimension that provides for the fixed precise gap 25 between the coupler 20 and the charge port 11. The dimensions of the plastic housing 12 of the coupler 20 are held tightly and consistently by using an injection molding process to fabricate it.

Thus there has been described an inductive charger apparatus employing fixed secondary cores and an insertable primary core having precise gaps therebetween. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. Inductive charging apparatus comprising:
   a charge port comprising:
      a charge port housing;
      an outer heat exchanger disposed adjacent the internal periphery of the charge port housing;
      first and second magnetically coupled magnetic core halves with an opening therebetween providing for a predetermined spacing between adjacent surfaces of the magnetic core halves, wherein said core halves are disposed in the charge port housing adjacent the heat exchanger;
      first and second secondary windings disposed adjacent the opening formed between the first and second magnetic core halves and disposed in an opening formed in each of the first and second magnetic core halves; and
   a charging coupler comprising:
      a coupler housing;
      a center magnetic core disposed in the coupler housing; and
      a primary winding disposed around the center magnetic core;
      and wherein the center magnetic core has a dimension such that defines a predetermined, relatively fixed gap between the respective adjacent surfaces of the first and second magnetic core halves and respective outer surface of the center magnetic core when the charging coupler is inserted into the charge port.

2. The apparatus of claim 1 wherein the first and second magnetic core halves comprise portions of an E-shaped core.

3. The apparatus of claim 1 wherein the shape of the center magnetic core is round.

4. The apparatus of claim 1 wherein the shape of the center magnetic core is rectangular.

5. The apparatus of claim 1 wherein the center magnetic core and magnetic core halves are disposed in an EE core configuration.

6. The apparatus of claim 1 Wherein the center magnetic core and magnetic core halves are disposed in an EP core configuration.

7. The apparatus of claim 1 wherein the center magnetic core and magnetic core halves are disposed in an RS core configuration.

8. The apparatus of claim 1 wherein the primary and secondary windings comprise helix-shaped windings.

9. The apparatus of claim 1 wherein the primary and secondary windings comprise multiple layer windings.

10. The apparatus of claim 1 wherein the primary and secondary windings comprise flat spiral windings having a single layer.

11. The apparatus of claim 1 wherein the center magnetic core has a circular shape.

12. The apparatus of claim 1 wherein the center magnetic core has a rectangular shape.

13. Inductive charging apparatus comprising:
    a charge port comprising:
       a charge port housing;
       an outer heat exchanger disposed adjacent the internal periphery of the charge port housing;
       first and second magnetically coupled ferrite core halves with an opening therebetween providing for a predetermined spacing between adjacent surfaces of the core halves, wherein said core halves are disposed in the charge port housing adjacent the heat exchanger;
       first and second secondary windings disposed adjacent the opening formed between the first and second ferrite core halves and disposed in an opening formed in each of the first and second ferrite core halves; and
       first and second inner heat exchangers disposed between the first and second secondary windings and the first and second ferrite core halves;
    a charging coupler comprising:
       a coupler housing;
       a ferrite center core disposed in the coupler housing; and
       a primary winding disposed around the ferrite center core;
       and wherein the ferrite center core has a dimension such that a predetermined, relatively fixed gap is provided between the respective adjacent surfaces of the first and second ferrite core halves and respective outer surface of the ferrite center core when the charging coupler is inserted into the charge port.

14. The apparatus of claim 13 wherein the first and second magnetic core halves comprise portions of an E-shaped core.

15. The apparatus of claim 13 wherein the shape of the center magnetic core is round.

16. The apparatus of claim 13 wherein the shape of the center magnetic core is rectangular.

17. The apparatus of claim 13 wherein the primary and secondary windings comprise helix-shaped windings.

18. The apparatus of claim 13 wherein the primary and secondary windings comprise multiple layer windings.

19. The apparatus of claim 13 wherein the primary and secondary windings comprise flat spiral windings having a single layer.

* * * * *